(12) United States Patent
Kaneshiro et al.

(10) Patent No.: US 9,211,587 B2
(45) Date of Patent: Dec. 15, 2015

(54) CUPROUS OXIDE POWDER AND METHOD FOR PRODUCING SAME

(75) Inventors: Yuki Kaneshiro, Okayama (JP); Shinichi Suenaga, Okayama (JP); Akihiro Asano, Okayama (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 14/240,069

(22) PCT Filed: Sep. 13, 2012

(86) PCT No.: PCT/JP2012/074130
§ 371 (c)(1),
(2), (4) Date: Feb. 21, 2014

(87) PCT Pub. No.: WO2013/047332
PCT Pub. Date: Apr. 4, 2013

(65) Prior Publication Data
US 2014/0199204 A1   Jul. 17, 2014

(30) Foreign Application Priority Data

Sep. 30, 2011 (JP) ................................. 2011-216951
May 28, 2012 (JP) ................................. 2012-120366
Jul. 26, 2012 (JP) ................................. 2012-165557

(51) Int. Cl.
| | |
|---|---|
| B22F 9/00 | (2006.01) |
| B22F 9/20 | (2006.01) |
| C01G 3/02 | (2006.01) |
| C22C 9/00 | (2006.01) |
| B22F 9/24 | (2006.01) |
| C22C 29/12 | (2006.01) |

(52) U.S. Cl.
CPC ... *B22F 9/20* (2013.01); *B22F 9/24* (2013.01); *C01G 3/02* (2013.01); *C22C 9/00* (2013.01); *C22C 29/12* (2013.01); *C01P 2002/50* (2013.01); *C01P 2004/03* (2013.01); *C01P 2004/51* (2013.01); *C01P 2004/62* (2013.01)

(58) Field of Classification Search
None
See application file for complete search history.

(56) References Cited

U.S. PATENT DOCUMENTS

| | | | |
|---|---|---|---|
| 3,186,833 A * | 6/1965 | Cech | ................................. 75/429 |
| 6,620,344 B2 | 9/2003 | Sano et al. | |
| 6,923,924 B2 | 8/2005 | Sano et al. | |
| 7,235,119 B2 | 6/2007 | Sano et al. | |
| 7,534,283 B2 | 5/2009 | Yamada et al. | |

| | | | |
|---|---|---|---|
| 2001/0003362 A1 * | 6/2001 | Sano et al. | ................... 252/512 |
| 2006/0213328 A1 * | 9/2006 | Yamada et al. | ................ 75/373 |
| 2006/0236813 A1 | 10/2006 | Zhao et al. | |

FOREIGN PATENT DOCUMENTS

| | | | |
|---|---|---|---|
| JP | 04116109 A | | 4/1992 |
| JP | 05221637 A | | 8/1993 |
| JP | 2000340030 A | | 12/2000 |
| JP | 2005-255447 A | * | 9/2005 |
| JP | 2005255445 A | | 9/2005 |
| JP | 2006022394 A | | 1/2006 |
| JP | 2006-069879 A | * | 3/2006 |
| JP | 2006265585 A | | 10/2006 |
| JP | 2007254846 A | | 10/2007 |
| JP | 2008050650 A | | 3/2008 |
| JP | 2008101245 A | | 5/2008 |
| JP | 2010059001 A | | 3/2010 |

OTHER PUBLICATIONS

Partial Translation of JP 2008-101245, May 2008.*
Agrawal Archana et al., "Hydrogen reduction of copper bleed solution from an Indian copper smelter for producing high purity copper powders", Hydrometallurgy, 2006, vol. 84, p. 218-224.
Supplementary European Search Report for Application No. EP 12 836 853.7 dated Mar. 6, 2015.

* cited by examiner

*Primary Examiner* — Steven Bos
(74) *Attorney, Agent, or Firm* — Bachman & LaPointe, P.C.

(57) ABSTRACT

There are provided a cuprous oxide powder having a smaller particle diameter than that of conventional cuprous oxide powders, and a method for producing the cuprous oxide powder by a chemical reducing process. In a method for producing a cuprous oxide powder by adding a reducing agent, such as a reducing sugar, to a solution containing copper hydroxide, which is formed by adding one of an alkali solution and a copper ion containing solution to the other thereof, to deposit cuprous oxide particles by reduction, 0.00001 to 0.04 moles (10 to 40000 ppm) of ferrous ions with respect to the amount of copper ions in the copper ion containing solution are added to the copper ion containing solution before forming copper hydroxide, to produce a cuprous oxide powder which has a mean primary particle diameter of not greater than 0.5 micrometers when it is measured by a scanning electron microscope (SEM), the cuprous oxide powder having a 50% particle diameter ($D_{50}$ diameter) of not greater than 0.8 micrometers when it is calculated by a laser diffraction particle size analysis, the cuprous oxide powder containing 30 ppm or more of iron.

8 Claims, 4 Drawing Sheets

CUPROUS OXIDE POWDER AND METHOD FOR PRODUCING SAME

TECHNICAL FIELD

The present invention relates generally to a cuprous oxide powder and a method for producing the same. More specifically, the invention relates to a cuprous oxide powder suitable for the raw materials of copper powders for electronic materials and so forth, and a method for producing the same.

BACKGROUND ART

Cuprous oxide powders have been used in various fields as the raw materials of copper powders for electronic materials, preservatives for ship bottom paints (antifouling paints), bactericides, agricultural chemicals, conductive coating materials, copper plating solutions, coloring materials for ceramics, catalysts, rectifiers, solar cells and so forth.

As examples of cuprous oxide powders used as the raw materials of copper powders for electronic materials, cuprous oxide powders are used as the raw materials of copper powders which are used for copper pastes for forming internal electrodes of ceramic multilayer electronic parts, such as ceramic multilayer capacitors and ceramic multilayer inductors, and external electrodes of ceramic multilayer capacitors and ceramic multilayer inductors.

In recent years, it is desired to reduce the thickness of electrodes of ceramic multilayer capacitors with the higher capacity and smaller size thereof. For that reason, it is desired to provide a copper powder of fine monodisperse copper particles having small particle diameters and a narrow particle size distribution (a small variation in particle diameters) as a metallic material for electrodes of ceramic multilayer capacitors and so forth.

Typical copper powders for electronic materials are produced by dry processes, such as atomizing processes, or wet processes, such as chemical reduction processes. In atomizing processes, it is possible to decrease impurities in copper powders by increasing the purity of the raw materials of the copper powders. However, since there has not been established techniques for efficiently obtaining copper powders of fine copper particles having small particle diameters and a narrow particles size distribution (a small variation in particle diameters), it is difficult to prevent coarse grains from being mixed therein, so that it is required to remove the coarse grains by sifting or the like. On the other hand, chemical reduction processes are suitable for the production of copper powders of fine monodisperse copper particles having small particle diameters and a narrow particle size distribution (a small variation in particle diameters).

As methods for producing fine copper powders by chemical reduction processes, there are proposed a method for producing a fine copper powder by reducing cuprous oxide (which is obtained by reducing copper hydroxide, which is deposited from an aqueous copper salt solution, by a reducing sugar being a week reducing agent) to metallic copper by a reducing agent of hydrazine (see, e.g., Japanese Patent Laid-Open No. 4-116109), a method for mixing a pH-controlled fluid dispersion of copper oxide with a reducing agent solution having a predetermined concentration to deposit fine particles of metallic copper by direct reduction (see, e.g., Japanese Patent Laid-Open No. 2006-22394), and a method for adding an alkali solution and a reducing agent solution (containing no carbon and no chlorine) to an aqueous solution containing cupric ions to deposit cuprous oxide particles by reduction to obtain a copper powder by reducing the deposited cuprous oxide particles (see, e.g., Japanese Patent Laid-Open No. 2010-59001).

However, cuprous oxide particles obtained by the method proposed in Japanese Patent Laid-Open No. 4-116109 have large particle diameters of about 4 µm, so that it is not possible to obtain a cuprous oxide powder having particle diameters of sub-microns. In the method proposed in Japanese Patent Laid-Open No. 2006-22394, fine metallic copper particles are deposited by directly reducing copper oxide, so that it is not possible to obtain cuprous oxide powder having particle diameters of sub-microns. In the method proposed in Japanese Patent Laid-Open No. 2010-59001, although it is possible to obtain a cuprous oxide powder having particle diameters of sub-microns and having a narrow particle size distribution (a small variation in particle diameters), it is desired to obtain a cuprous oxide powder having a smaller particle diameter.

DISCLOSURE OF THE INVENTION

It is therefore an object of the present invention to eliminate the aforementioned problems and to provide a cuprous oxide powder having a smaller particle diameter than that of conventional cuprous oxide powders, and a method for producing the same by a chemical reduction process.

In order to accomplish the aforementioned and other objects, the inventors have diligently studied and found that it is possible to produce a cuprous oxide powder having a smaller particle diameter than that of conventional cuprous oxide powders if ferrous ions are added to a copper ion containing solution before forming copper hydroxide in a method for producing a cuprous oxide powder by adding a reducing agent to a solution containing copper hydroxide, which is formed by adding one of an alkali solution and a copper ion containing solution to the other thereof, to deposit cuprous oxide particles by reduction. Thus, the inventors have made the present invention.

According to the present invention, there is provided a method for producing a cuprous oxide powder, the method comprising the steps of: adding ferrous ions to a copper ion containing solution; adding one of an alkali solution and the copper ion containing solution, to which the ferrous ions are added, to the other thereof to form copper hydroxide; and adding a reducing agent to the solution, in which copper hydroxide is formed, to deposit cuprous oxide particles by reduction.

In this method for producing a cuprous oxide powder, the amount of the added ferrous ions is preferably 0.00001 moles (10 ppm) or more with respect to 1 mole of copper ions in the copper ion containing solution, and preferably 0.04 moles (40000 ppm) or less with respect to 1 mole of copper ions in the copper ion containing solution. The reducing agent is preferably a reducing sugar.

According to the present invention, there is provided a cuprous oxide powder wherein a mean primary particle diameter measured by a scanning electron microscope (SEM) is not greater than 0.5 micrometers and which contains 30 ppm or more of iron. Preferably, in this cuprous oxide, a 50% particle diameter ($D_{50}$ diameter) calculated by a laser diffraction particle size analysis is not greater than 0.8 micrometers.

According to the present invention, there is provided a method for producing a copper powder wherein the cuprous oxide powder produced by the above-described method is further reduced by a reducing agent. In this method for producing a copper powder, the reducing agent used for reducing the cuprous oxide powder is preferably hydrazine.

According to the present invention, there is provided a copper powder which contains 10 to 5000 ppm of iron. Preferably, in this copper powder, a 50% particle diameter ($D_{50}$ diameter) calculated by a laser diffraction particle size analysis is not greater than 5 micrometers, and a BET specific surface area is not less than 0.4 $m^2/g$.

According to the present invention, it is possible to produce a cuprous oxide powder having a smaller particle diameter than that of conventional cuprous oxide powders in a chemical reduction process which can produce a cuprous oxide powder having small particle diameters and a small variation in particle diameters.

Cuprous oxide powders according to the present invention can be used as the raw materials of copper powders for electronic materials, preservatives for ship bottom paints (antifouling paints), bactericides, agricultural chemicals, conductive coating materials, copper plating solutions, coloring materials for ceramics, catalysts, rectifiers, solar cells and so forth. As examples of the cuprous oxide powders used as the raw materials of copper powders for electronic materials, the cuprous oxide powders can be used as the raw materials of copper powders which are used for copper pastes for forming internal electrodes of ceramic multilayer electronic parts, such as ceramic multilayer capacitors and ceramic multilayer inductors, and external electrodes of ceramic multilayer capacitors and ceramic multilayer inductors.

BEST MODE FOR CARRYING OUT THE INVENTION

Figure 1:
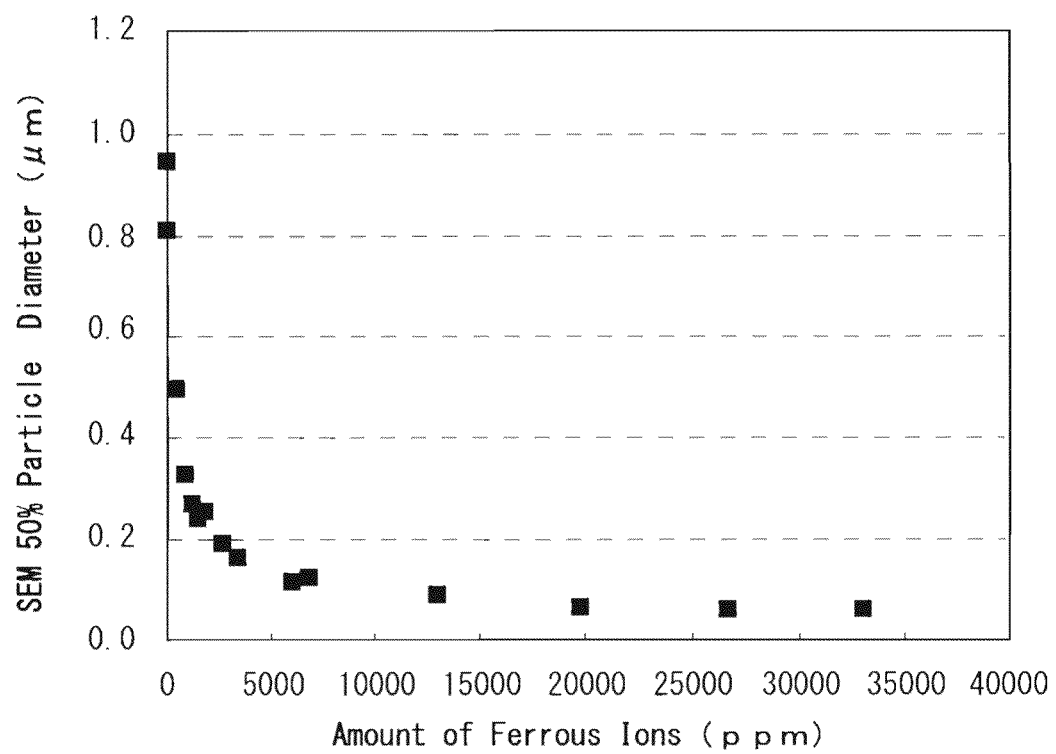
FIG. 1 is a graph showing the relationship between the amount of ferrous ions added with respect to the amount of copper ions in the solution and the SEM 50% particle diameter in Examples and Comparative Examples.

In the preferred embodiment of a method for producing a cuprous oxide powder according to the present invention, ferrous ions are added to a copper ion containing solution before forming copper hydroxide, in a method for producing a cuprous oxide powder by adding a reducing agent to a solution containing copper hydroxide, which is formed by adding one of an alkali solution and a copper ion containing solution to the other thereof, to deposit cuprous oxide particles by reduction.

The copper ion containing solution may be an aqueous solution of a copper compound, such as copper sulfate, copper chloride, copper nitrate or copper acetate. In particular, the copper ion containing solution is preferably an aqueous solution of copper sulfate. The copper ion containing solution is preferably an aqueous solution containing cupric ions.

The ferrous ions are added to the copper ion containing solution in order to fine the cuprous oxide particles deposited by reduction. By increasing the amount of the added ferrous ions, it is possible to decrease the particle diameters of the cuprous oxide particles deposited by reduction. That is, it is possible to control the particle diameters of the cuprous oxide particles by the amount of the added ferrous ions. The ferrous ion source may be any one of various iron compounds. The ferrous iron source is preferably any one of iron (II) chloride (including iron (II) chloride hydrate), iron (II) bromide (including iron (II) bromide hydrate), iron (II) sulfate (including iron (II) sulfate hydrate) and a mixture thereof, and is more preferably iron (II) sulfate (including iron (II) sulfate hydrate). The amount of the ferrous ions to be added is preferably 0.00001 moles (10 ppm) or more, more preferably 0.0002 moles (200 ppm) or more, with respect to 1 mole of copper ions in the copper ion containing solution. However, if the amount of the ferrous ions to be added is excessive, the effect of the decrease of the particle diameters of cuprous oxide particles is not increased in proportion to the amount thereof. If the amount of added ferrous ions is too large, there is some possibility that the ferrous ions may remain as impurities in the cuprous oxide powder. Therefore, the amount of the ferrous ions to be added is preferably 0.04 moles (40000 ppm) or less, more preferably 0.025 moles (25000 ppm) or less, with respect to 1 mole of copper ions in the copper ion containing solution.

The ferrous ions are previously mixed with the copper ion containing solution to be uniformed. If the ferrous ions are added to the copper ion containing solution before the copper ion containing solution is added to the alkali solution, it is possible to effectively react them.

The alkali solution may be any one of generally used various alkali solutions, such as solutions of sodium hydroxide, potassium hydroxide and lithium hydroxide, and is preferably a solution of sodium hydroxide. The amount of alkali to be added is different in accordance with the amount of the reducing agent to be added (since the strength of reduction due to the reducing agent is different in accordance with the pH of the solution). If an aqueous solution containing cupric ions is used as the copper ion containing solution, the equivalent amount of alkali to be added is preferably 1.0 to 3.0 with respect to that of the cupric ions. Furthermore, if an alkali solution contaminated with carbon dioxide in the air is used, there is some possibility that cuprous oxide to be formed may contain carbon, so that it is required to be careful not to contaminate the alkali solution with carbon dioxide in the air. For that reason, the alkali solution is preferably purged with an inert gas, such as nitrogen gas, to prevent carbon dioxide from entrapping therein.

The reducing agent may be any one of various reducing agents, such as hydroxylamine sulfate (hydroxyl ammonium sulfate), hydroxylamine nitrate, sodium sulfite, sodium hydrogen sulfite, sodium dithionite (hydrosulfite), hydrazine sulfate, hydrazine phosphate, hydrazine, hypophosphoric acid, sodium hypophosphite, glucose, fructose, maltose and lactose. Among these reducing agents, the reducing agent is preferably any one of reducing sugars, such as glucose, fructose, maltose and lactose, and more preferably glucose, in view of the costs, availability and safety in handling. The amount of the reducing agent to be added is required not to be less than an amount capable of stoichiometrically reducing cupric ions to cuprous ions (i.e., to cuprous oxide) if an aqueous solution containing cupric ions is used as the copper ion containing solution. If the amount of the reducing agent to be added is too large, the costs thereof is disadvantageous, and the cupric ions may be reduced to copper in accordance with the pH of the solution and the kind of the reducing agent, so that the molar ratio of the reducing agent to copper is preferably in the range of from 0.1 to 3.0.

The reaction solution is preferably stirred so as to be uniformly mixed when reduction is carried out. Examples of the stirring methods include a method for stirring the reaction solution with a magnet stirrer, a method for stirring the reaction solution by arranging a stirring rod with blades in the solution to rotate the stirring rod by an external motor, and so forth. The reaction temperature during this reduction may be in the range of from about 10° C., to about 100° C., and is preferably in the range of from 40° C., to 80° C., from the standpoint of the controllability of reaction.

A cuprous oxide containing slurry thus obtained is filtered and washed to obtain an aggregated cuprous oxide cake. The filtering and washing method may be any one of a method for washing powder fixed by a filter press or the like, a method for repeatedly carrying out an operation for decanting the slurry to remove supernatant liquid, adding pure water thereto to stir the slurry, and then, decanting the slurry again to remove supernatant liquid, and a method for repeatedly carrying out an operation for repulping cuprous oxide obtained after the filtration, and then, carrying out the filtration again. The filtering and washing method is preferably a method capable of removing impurities, which locally remain in the obtained cuprous oxide cake, as much as possible. If the obtained cuprous oxide cake is so dried at a temperature in an atmosphere as not to be reduced to cupper without being oxidized to copper oxide (CuO) (e.g., dried in vacuum), a cuprous oxide powder can be obtained. If necessary, treatments, such as dry crushing, screening and air classification, may be carried out.

By the above-described preferred embodiment of a method for producing a cuprous oxide powder according to the present invention, it is possible to produce a cuprous oxide powder wherein a mean primary particle diameter measured by a scanning electron microscope (SEM) is not greater than 0.5 micrometers and which contains 30 ppm or more (preferably 60 ppm or more) of iron, the cuprous oxide powder preferably having a 50% particle diameter ($D_{50}$ diameter) of not greater than 0.8 micrometers when it is calculated by the laser diffraction particle size analysis. If the mean primary particle diameter measured by the scanning electron microscope (SEM) is not greater than 0.5 micrometers as this cuprous oxide powder, when the cuprous oxide powder is used as the raw material of a copper powder for electronic materials, e.g., as the raw material of a copper powder used for a copper paste for forming internal electrodes of ceramic multilayer electronic parts, such as ceramic multilayer capacitors and ceramic multilayer inductors, and when the internal electrodes and dielectric ceramic green sheets are laminated, there is no possibility that coarse particles may exist in the thin films of the internal electrodes to pass through the dielectric layers to cause defective insulation. If the 50% particle diameter ($D_{50}$ diameter) measured by a laser diffraction particle analyzer (a laser diffraction particle size analyzer) is not greater than 0.8 micrometers, when the cuprous oxide powder is used as the raw material of a copper powder for electronic materials, e.g., as the raw material of a copper powder used for a copper paste for forming internal electrodes of ceramic multilayer electronic parts, such as ceramic multilayer capacitors and ceramic multilayer inductors, it is possible to realize the lamination of internal electrodes necessary for the increase of capacity and miniaturization of ceramic multilayer capacitors or the like.

The cuprous oxide powder produced by the above-described preferred embodiment of a method for producing a cuprous oxide powder according to the present invention can be used in various fields as the raw materials of copper powders, ship bottom paints (antifouling paints), conductive coating materials, copper plating solutions, solar cells and so forth.

When the cuprous oxide powder is used as the raw material of a copper powder, such as a copper powder for electronic materials, it is possible to obtain a copper powder by reducing the cuprous oxide powder. As this reducing method, there may be used a dry reducing method using a reducing gas, such as carbon monoxide and hydrogen gas, and a wet reducing method using a reducing agent, such as a hydrated hydrazine and sodium borohydride. If a copper cake obtained by the wet reducing method is dried so as not to be oxidized similar to the cuprous oxide cake, it is possible to obtain copper particles. If necessary, treatments, such as dry crushing, screening and air classification, may be carried out.

When the cuprous oxide powder is used for ship bottom paints (antifouling paints), generally used components may be mixed in order to adjust paints, such as pigments, solvents, plasticizers, fillers and hardening promoters. In order to improve the antifouling property thereof, inorganic or organic copper compounds, such as copper thiocyanide, copper rhodanate and copper pyridine compounds, may be mixed.

When the cuprous oxide powder is used for conductive coating materials, any one of various resins (e.g., acrylic resins, cellulosic resins), a solvent (e.g., terpineol), a glass frit, and so forth may be mixed in accordance with the field of application thereof. In addition, a small amount of cuprous oxide powder may be added as an additive of conductive coating materials.

As an example of the cuprous oxide powder used for copper plating solutions, the cuprous oxide powder may be used as the source of copper ions for electroless copper plating solutions using no copper sulfate.

As an example of the cuprous oxide powder used for solar cells, a cuprous oxide Schottkey barrier solar cell may be prepared by forming a transparent electrode film on a thin film containing cuprous oxide powder formed on a substrate.

Furthermore, an iron containing copper powder may be obtained by decanting the cuprous oxide containing slurry, which is obtained by the above-described preferred embodiment of a method for producing a cuprous oxide powder according to the present invention, to remove supernatant liquid, adding pure water thereto to stir the slurry, and then, adding a reducing agent thereto (alternatively, adding a reducing agent to a cuprous oxide containing slurry obtained by dispersing the obtained cuprous oxide powder in pure water again). The reducing agent may be any reducing agent capable of reducing cuprous oxide to metallic copper, and is preferably hydrated hydrazine. The equivalent amount of the reducing agent to be added is preferably 1.0 to 3.0, more preferably 1.5 to 2.5, with respect to that of copper. During the reduction, the reducing agent is added to the slurry at a temperature of 30 to 45° C., to cause an unsaturated state in which nuclei of metallic copper are not produced, and then, the temperature of the slurry is raised at 0.1 to 3° C./min. to produce nuclei of metallic copper to further add the reducing agent to the slurry at a temperature of 60 to 90° C., to cause the nuclei of metallic copper to grow, so that it is possible to obtain the iron containing copper powder.

Examples of a cuprous oxide powder and a method for producing the same according to the present invention will be described below in detail.

EXAMPLE 1

First, an alkali solution was prepared by putting 76.4 g of an aqueous solution of 48.5 wt % sodium hydroxide and 323.6 g of pure water in a 1 L reaction vessel while the revolving speed of a stirring rod in the reaction vessel was adjusted at 441 rpm and while the temperature in the reaction vessel was adjusted at 27.6° C.

Then, an aqueous solution obtained by adding 0.032 g of iron sulfate (II) heptahydrate (produced by KISHIDA CHEMICAL Co., Ltd.) serving as ferrous ions to an aqueous solution of copper sulfate, which was obtained by dissolving 93.4 g of copper sulfate pentahydrate in 258.3 g of pure water, was added to the alkali solution in the reaction vessel. The solution thus obtained was stirred and aged for ten minutes to deposit copper hydroxide.

Then, an aqueous solution of glucose prepared by dissolving 100.9 g of glucose serving as a reducing agent in 170.1 g of pure water was added to the slurry in the reaction vessel. The temperature of the solution thus prepared was raised at 1.2° C./min. to 70.6° C. After the temperature of 70.6° C. was held for 30 minutes, stirring was stopped, and the solid-liquid separation of the solution was carried out by suction filtration. Thereafter, the cake obtained by washing the solid with pure water was vacuum-dried for one night to obtain a cuprous oxide powder.

EXAMPLES 2-9

Cuprous oxide powders were obtained by the same method as that in Example 1, except that the amount of added iron sulfate (II) pentahydrate was 0.100 g (Example 2), 0.169 g (Example 3), 0.240 g (Example 4), 0.659 g (Example 5), 1.357 g (Example 6), 2.050 g (Example 7), 2.751 g (Example 8) and 3.446 g (Example 9), respectively.

EXAMPLE 10

First, an alkali solution was prepared by putting 2.23 kg of an aqueous solution of 48.5 wt % sodium hydroxide and 8.33 kg of pure water in a 24 L reaction vessel while the revolving speed of a stirring rod in the reaction vessel was adjusted at 220 rpm and while the temperature in the reaction vessel was adjusted at 27.6° C.

Then, an aqueous solution obtained by adding 2.181 g of iron sulfate (II) heptahydrate (produced by KISHIDA CHEMICAL Co., Ltd.) serving as ferrous ions to an aqueous solution of copper sulfate, which was obtained by dissolving 2.74 kg of copper sulfate pentahydrate in 6.54 kg of pure water, was added to the alkali solution in the reaction vessel. The solution thus obtained was stirred and aged for ten minutes to deposit copper hydroxide.

Then, an aqueous solution of glucose prepared by dissolving 0.74 kg of glucose serving as a reducing agent in 3.72 kg of pure water was added to the slurry in the reaction vessel. The temperature of the solution thus prepared was raised at 1.2° C./min. to 70.6° C. After the temperature of 70.6° C., was held for 30 minutes to form cuprous oxide, stirring was stopped, and the solid-liquid separation of the solution was carried out by suction filtration. Thereafter, the cake obtained by washing the solid with pure water was vacuum-dried for one night to obtain a cuprous oxide powder.

EXAMPLES 11-13

Cuprous oxide powders were obtained by the same method as that in Example 10, except that the amount of added iron sulfate (II) pentahydrate was 4.363 g (Example 11), 8.725 g (Example 12) and 17.45 g (Example 13), respectively.

COMPARATIVE EXAMPLE 1

A cuprous oxide powder was obtained by the same method as that in Example 1, except that iron sulfate (II) pentahydrate was not added.

COMPARATIVE EXAMPLE 2

A cuprous oxide powder was obtained by the same method as that in Example 1, except that 0.117 g of iron sulfate (III)

n-hydrate (produced by Wako Pure Chemical Industries, Ltd.) was added as ferric ions in place of iron sulfate (II) pentahydrate.

The cuprous oxide powders obtained in these Examples and Comparative Examples were observed at a magnifying power of 50,000 by means of a field emission scanning electron microscope (FE-SEM) (S-4700 produced by Hitachi, Ltd.) to obtain FE-SEM images. In each of the FE-SEM images thus obtained, the Heywood's diameter (diameter corresponding to a projection area circle) of each of 100 particles, i.e., the diameter of a circle having the same area as that of a particle on the FE-SEM image, was obtained by an image analysis type particle size distribution measuring software (Mac-View Ver. 4 produced by Mountech Co., Ltd.), and an arithmetic mean of the obtained diameters was obtained as a 50% particle diameter (a SEM 50% particle diameter). Furthermore, when it was not possible to obtain the Heywood's diameter of each of 100 particles in the FE-SEM image at a magnifying power of 50,00, the diameter of the particle was measured by an image taken at a lower magnifying power. As a result, in Examples 1-13 and Comparative Examples 1-2, the SEM 50% particle diameter was 0.50 micrometers (Example 1), 0.27 micrometers (Example 2), 0.26 micrometers (Example 3), 0.20 micrometers (Example 4), 0.13 micrometers (Example 5), 0.09 micrometers (Example 6), 0.06 micrometers (Example 7), 0.06 micrometers (Example 8), 0.06 micrometers (Example 9), 0.33 micrometers (Example 10), 0.24 micrometers (Example 11), 0.17 micrometers (Example 12), 0.12 micrometers (Example 13), 0.81 micrometers (Comparative Example 1), and 0.96 micrometers (Comparative Example 2), respectively.

The 50% particle diameter ($D_{50}$) of each of the cuprous oxide powders obtained in Examples and Comparative Examples was measured by a laser diffraction particle analyzer (LS-230 produced by Beckman Coulter, Inc.). As each of the measured samples, there was used a solution (a concentration adjusted solution) obtained by sufficiently dispersing the cuprous oxide powder, which was obtained in each of Examples and Comparative Examples, and pure water by an ultrasonic dispersing vessel or the like after putting the cuprous oxide powder and pure water in a beaker so that the deflection scattering intensity (PIDS) displayed in the laser diffraction particle analyzer is in the range of from 45% to 55%. At the optical model, the real number part of refraction index of liquid was set to be 1.332, the real number part of refraction index of the sample was set to be 2.7, and the imaginary number part was set to be 0.01. As a result, the 50% particle diameter ($D_{50}$) of each of the cuprous oxide powders obtained in Examples 1-13 and Comparative Examples 1-2 was 0.8 micrometers (Example 1), 0.4 micrometers (Example 2), 0.3 micrometers (Example 3), 0.2 micrometers (Example 4), 0.1 micrometers (Example 5), 0.1 micrometers (Example 6), 0.1 micrometers (Example 7), 0.1 micrometers (Example 8), 0.1 micrometers (Example 9), 0.5 micrometers (Example 10), 0.3 micrometers (Example 11), 0.2 micrometers (Example 12), 0.1 micrometers (Example 13), 1.1 micrometers (Comparative Example 1), and 1.0 micrometers (Comparative Example 2), respectively.

The content of iron contained in the cuprous oxide powder obtained in each of Examples and Comparative Examples was measured by an inductively coupled plasma (ICP) atomic emission spectrophotometer (IRIS/AP produced by Thermo Jarrell-Ash Co., Ltd.). As a result, the content of iron was 90 ppm (Example 1), 200 ppm (Example 2), 270 ppm (Example 3), 350 ppm (Example 4), 882 ppm (Example 5), 2400 ppm (Example 6), 3800 ppm (Example 7), 4600 ppm (Example 9), 100 ppm (Example 10), 190 ppm (Example 11), 420 ppm (Example 12), 810 ppm (Example 13), 10 ppm (Comparative Example 1), and 140 ppm (Comparative Example 2), respectively.

Figure 2:
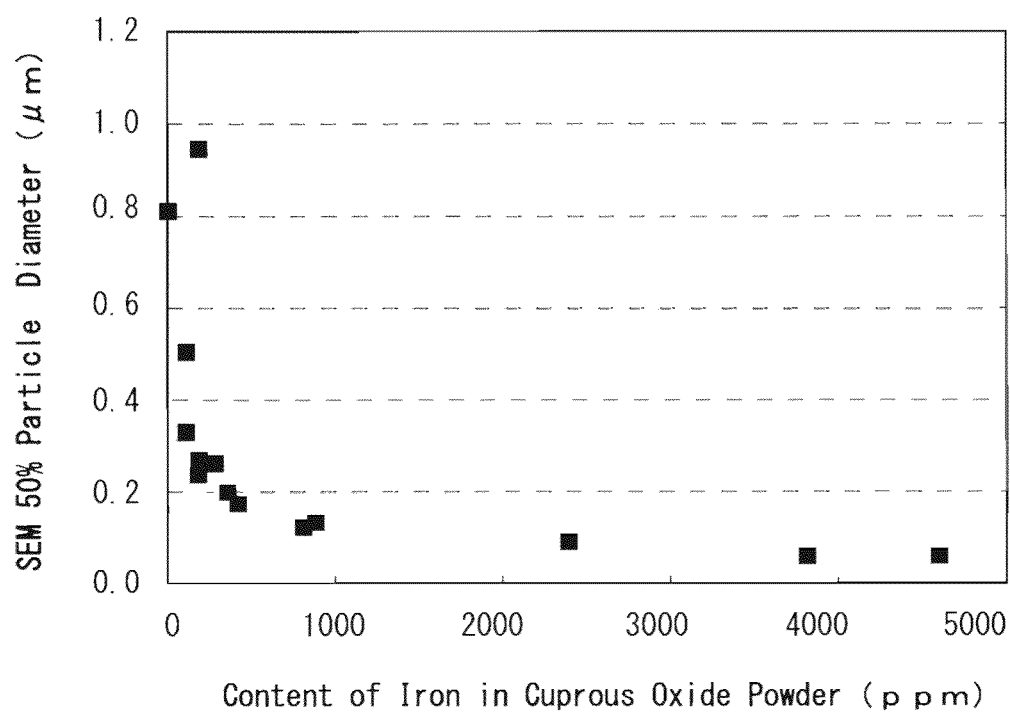
FIG. 2 is a graph showing the relationship between the content of iron in the cuprous oxide powder and the SEM 50% particle diameter in Examples and Comparative Examples.
Figure 3:
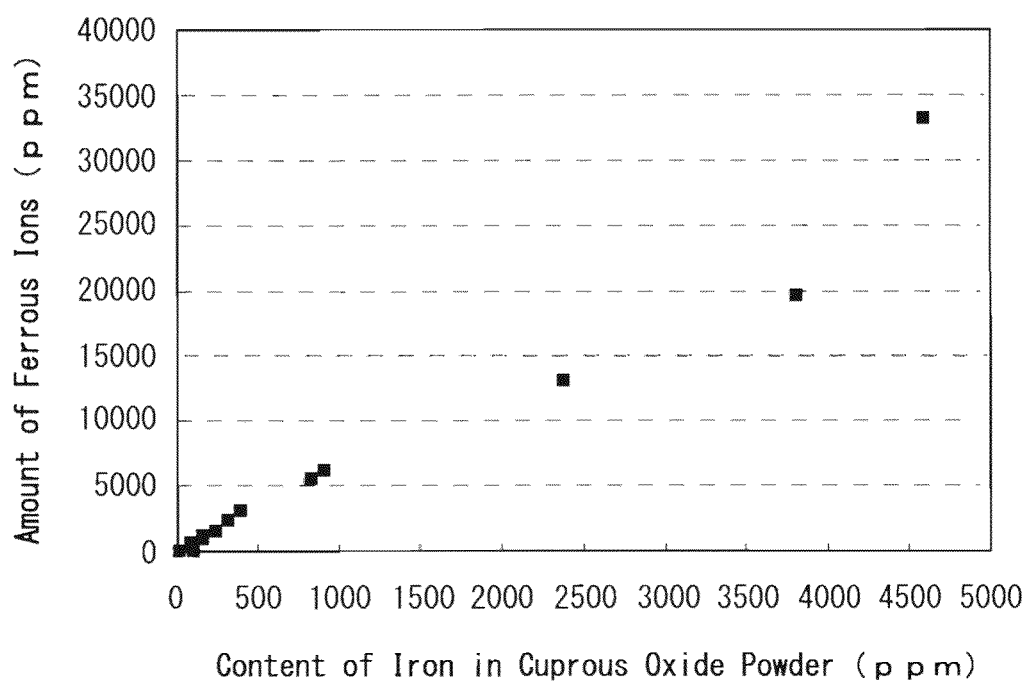
FIG. 3 is a graph showing the relationship between the content of iron in the cuprous oxide powder and the amount of the added ferrous ions in Examples and Comparative Examples.
Figure 4:
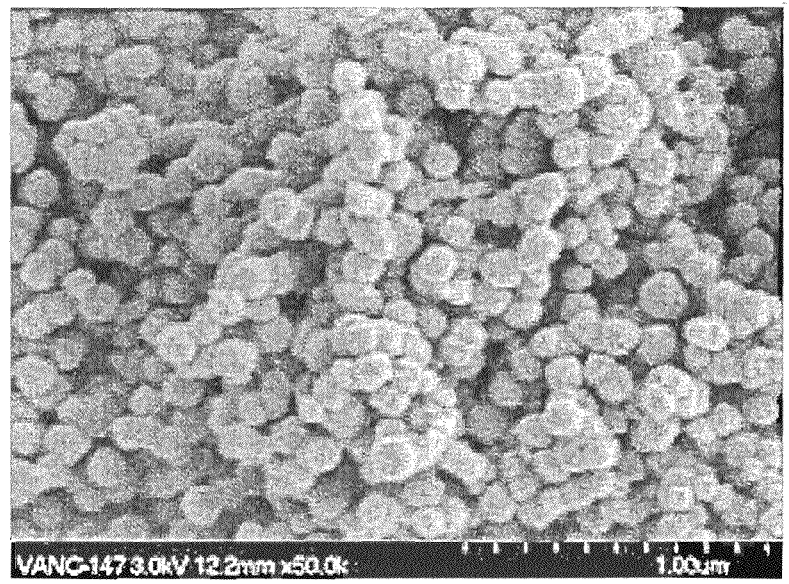
FIG. 4 is an FE-SEM image of the cuprous oxide powder obtained in Example 5.

These results are shown Table 1. In Examples and Comparative Examples, the relationship between the amount of added ferrous ions with respect of the amount of copper ions in the solution and the SEM 50% particle diameter is shown in FIG. 1. In addition, the relationship between the content of iron in the cuprous oxide powder and the SEM 50% particle diameter is shown in FIG. 2, and the content of iron in the cuprous oxide powder and the amount of added ferrous ions is shown in FIG. 3. Moreover, the FE-SEM image (taken at a magnifying power of 50,000) of the cuprous oxide powder obtained in Example 5 is shown in FIG. 4.

TABLE 1

| | Amount of added ferrous ions (ppm) | Amount of added ferric ions (ppm) | SEM 50% particle diameter (µm) | 50% particle diameter ($D_{50}$) (µm) of cuprous oxide powder by laser diffraction particle analyzer | Content of iron in cuprous oxide powder (ppm) |
|---|---|---|---|---|---|
| Ex. 1 | 286 | — | 0.50 | 0.8 | 90 |
| Ex. 2 | 957 | — | 0.27 | 0.4 | 200 |
| Ex. 3 | 1628 | — | 0.26 | 0.3 | 270 |
| Ex. 4 | 2298 | — | 0.20 | 0.2 | 350 |
| Ex. 5 | 6322 | — | 0.13 | 0.1 | 882 |
| Ex. 6 | 13029 | — | 0.09 | 0.1 | 2400 |
| Ex. 7 | 19736 | — | 0.06 | 0.1 | 3800 |
| Ex. 8 | 26443 | — | 0.06 | 0.1 | — |
| Ex. 9 | 33150 | — | 0.06 | 0.1 | 4600 |
| Ex. 10 | 715 | — | 0.33 | 0.5 | 100 |
| Ex. 11 | 1431 | — | 0.24 | 0.3 | 190 |
| Ex. 12 | 2862 | — | 0.17 | 0.2 | 420 |
| Ex. 13 | 5723 | — | 0.12 | 0.1 | 810 |
| Comp. 1 | — | — | 0.81 | 1.1 | 10 |
| Comp. 2 | — | 1583 | 0.96 | 1.0 | 140 |

As shown in Table 1, in the cuprous oxide powders obtained in Examples 1-13, the SEM 50% particle diameter and the 50% particle diameter ($D_{50}$) measured by the laser diffraction particle analyzer are smaller than those in Comparative Examples 1 and 2, and the 50% particle diameter ($D_{50}$) is in the range of sub-microns. It can be seen from FIG. 1 that the particle diameter of the obtained cuprous oxide powder is smaller as the amount of added ferrous ions is larger, so that the particle diameter of the cuprous oxide powder can be adjusted by the amount of added ferrous ions. It can be seen from FIG. 2 that the content of iron in the cuprous oxide powder is larger as the particle diameter of the cuprous oxide powder is smaller, and it can be seen from FIG. 3 that the content of ion in the obtained cuprous oxide powder is larger as the amount of added ferrous ions is larger, so that it can be seen that the amount of added ferrous ions contributes to the particle diameter of the cuprous oxide powder.

EXAMPLE 14

After cuprous oxide was formed by adding the reducing agent to the slurry by the same method as that in Example 10, slurry obtained by bubbling air at a flow rate of 2.3 L/min. for 200 minute was allowed to stand. Thereafter, supernatant liquid was removed from the slurry, and 2400 g of pure water was added thereto so that the weight of the slurry was adjusted to 4800 g. While the slurry thus obtained was stirred and temperature-controlled, 368.8 g of hydrated hydrazine having a purity of 80% (the equivalent amount of hydrazine being 2.15) was dispensed to be added to the slurry several times to obtain a copper powder. Specifically, after hydrazine having an equivalent amount of 0.22 was added to the slurry at 44° C., the temperature of the slurry was raised to 49° C. Then, hydrazine having a total equivalent amount of 0.67 was divided to be added to the slurry. Thereafter, the temperature of the slurry was raised at 0.25C /min. to 83° C., and hydrazine having a total equivalent amount of 1.26 was divided to be added to the slurry to obtain a copper powder. Furthermore, the equivalent amount of hydrazine is a rate with respect to a stoichiometric amount of hydrazine assuming that the stoichiometric amount of hydrazine required to reduce all of cuprous oxide to metallic copper is an equivalent amount of 1. For example, if the amount of added hydrazine amount is an equivalent amount of 0.1 when 90 minutes have passed, it means that the amount of added hydrazine was one-tenth the stoichiometric amount of hydrazine required to reduce all of cuprous oxide to metallic copper when 90 minutes have passed.

EXAMPLES 15 AND 16

A copper powder was obtained by the same method as that in Example 14, except that the amount of added iron (II) sulfate heptahydrate was 4.363 g (Example 15) and 8.725 g (Example 16), respectively.

COMPARATIVE EXAMPLE 3

A copper powder was obtained by the same method as that in Example 14, except that iron (II) sulfate heptahydrate was not added.

The particle diameter of the copper powder obtained in each of Examples 14-16 and Comparative Example 3 was measured using a lens having a focal length of 20 mm by means of a laser diffraction particle (HELOS H0780 produced by SYMPATIC Co., Ltd.) to calculate the 10% particle diameter ($D_{10}$ diameter), 50% particle diameter ($D_{50}$ diameter) and 90% particle diameter ($D_{90}$ diameter). As a result, the particle diameter was $D_{10}$=1.6 micrometers, $D_{50}$=2.7 micrometers and $D_{90}$=3.7 micrometers in Example 14, $D_{10}$=1.3 micrometers, $D_{50}$=2.4 micrometers and $D_{90}$=3.4 micrometers in Example 15, $D_{10}$=1.3 micrometers, $D_{50}$=2.6 micrometers and $D_{90}$=3.8 micrometers in Example 16, and $D_{10}$=2.2 micrometers, $D_{50}$=3.1 micrometers and $D_{90}$=4.0 micrometers in Comparative Example 3, respectively.

The content of iron in the copper powder obtained in each of Example 14-16 and Comparative Example 3 was measured by an inductively coupled plasma (ICP) atomic emission spectrophotometer (IRIS/AP produced by Thermo Jarrell-Ash Co., Ltd.). As a result, the content of iron was 50 ppm (Example 14), 170 ppm (Example 15), 440 ppm (Example 16) and 2 ppm (Comparative Example 3), respectively.

The content of oxygen in the copper powder obtained in each of Examples 14-16 and Comparative Example 3 was measured by an oxygen/nitrogen analyzer (TC-436 produced by LECO Co., Ltd.). As a result, the content of oxygen was 0.08 wt % (Example 14), 0.10 wt % (Example 15), 0.15 wt % (Example 16) and 0.11 wt % (Comparative Example 3), respectively.

The content of carbon in the copper powder obtained in each of Examples 14-16 and Comparative Example 3 was measured by a carbon/sulfur analyzer (EMIA-220V produced by HORIBA, Ltd.). As a result, the content of carbon was 0.05 wt % (Example 14), 0.05 wt % (Example 15), 0.07 wt % (Example 16) and 0.06 wt % (Comparative Example 3), respectively.

The BET specific surface area of the copper powder obtained in each of Examples 14-16 and Comparative Example 3 was obtained by means of a BET specific surface area measuring apparatus (4-Sorb US produced by Yuasa Ionics Co., Ltd.) using the BET method. As a result, the BET specific surface area was 0.40 m$^2$/g (Example 14), 0.49 m$^2$/g (Example 15), 0.50 m$^2$/g (Example 16) and 0.36 m$^2$/g (Comparative Example 3), respectively. The BET particle diameter of the copper powder was calculated from the BET specific surface area assuming that the density of a single copper particle was 8.9 g/cm$^2$. As a result, the BET particle diameter was 1.7 micrometers (Example 14), 1.4 micrometers (Example 15), 1.4 micrometers (Example 16) and 1.9 micrometers (Comparative Example 3), respectively.

The results thereof are shown in Table 2.

TABLE 2

| | Particle diameter of copper powder based on laser diffraction (µm) | | | Amount of iron in copper powder (ppm) | O (wt %) | C (wt %) | BET specific surface area (m$^2$/g) | BET particle diameter (µm) |
|---|---|---|---|---|---|---|---|---|
| | $D_{10}$ | $D_{50}$ | $D_{90}$ | | | | | |
| Ex. 14 | 1.6 | 2.7 | 3.7 | 50 | 0.08 | 0.05 | 0.40 | 1.7 |
| Ex. 15 | 1.3 | 2.4 | 3.4 | 170 | 0.10 | 0.05 | 0.49 | 1.4 |
| Ex. 16 | 1.3 | 2.6 | 3.8 | 440 | 0.15 | 0.07 | 0.50 | 1.4 |
| Comp. 3 | 2.2 | 3.1 | 4.0 | 2 | 0.11 | 0.06 | 0.36 | 1.9 |

The invention claimed is:

1. A method for producing a cuprous oxide powder, the method comprising the steps of:
adding ferrous ions to a copper ion containing solution, the amount of the added ferrous ions being in the range of from 0.0002 moles to 0.04 moles with respect to 1 mole of copper ions in the copper ion containing solution;
adding one of an alkali solution and the copper ion containing solution, to which the ferrous ions are added, to the other thereof to form copper hydroxide in solution; and
adding a reducing agent to the copper hydroxide in solution, to deposit cuprous oxide particles by reduction.

2. A method for producing a cuprous oxide powder as set forth in claim 1, wherein said reducing agent is a reducing sugar.

3. A cuprous oxide powder which has a mean primary particle diameter of not greater than 0.5 micrometers measured by a scanning electron microscope and which contains 30 ppm or more of iron.

4. A cuprous oxide powder as set forth in claim 3, which has a 50% particle diameter ($D_{50}$ diameter) of not greater than 0.8 micrometers calculated by a laser diffraction particle size analysis.

5. A method for producing a copper powder wherein said cuprous oxide powder produced by a method as set forth in claim 1 is further reduced by a reducing agent.

6. A method for producing a copper powder as set forth in claim 5, wherein said reducing agent used for reducing the cuprous oxide powder is hydrazine.

7. A copper powder which has a 50% particle diameter ($D_{50}$ diameter) of not greater than 5 micrometers calculated by a laser diffraction particle size analysis and which contains 10 to 5000 ppm of iron.

8. A copper powder as set forth in claim 7, wherein a BET specific surface area is not less than 0.4 $m^2/g$.

* * * * *